Aug. 8, 1950     D. RUSHWORTH     2,518,072
REEL FOR PORTABLE ELECTRICALLY OPERATED TOOLS
Filed Aug. 26, 1947     2 Sheets-Sheet 1
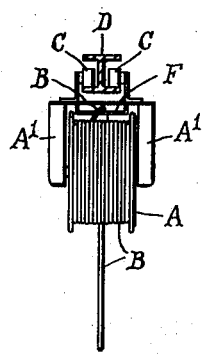
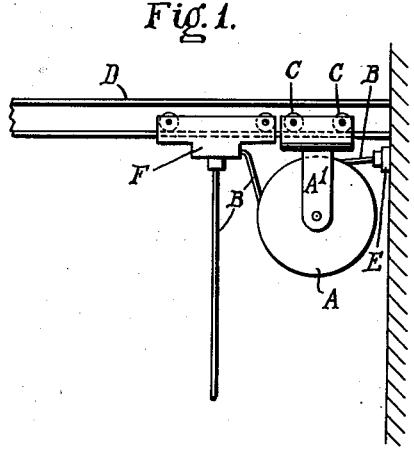
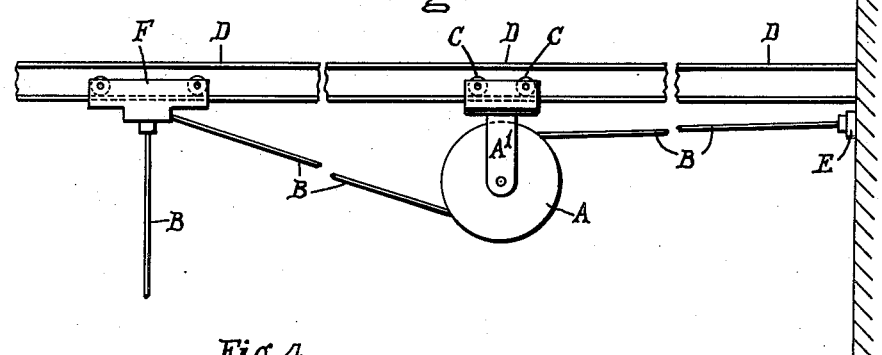
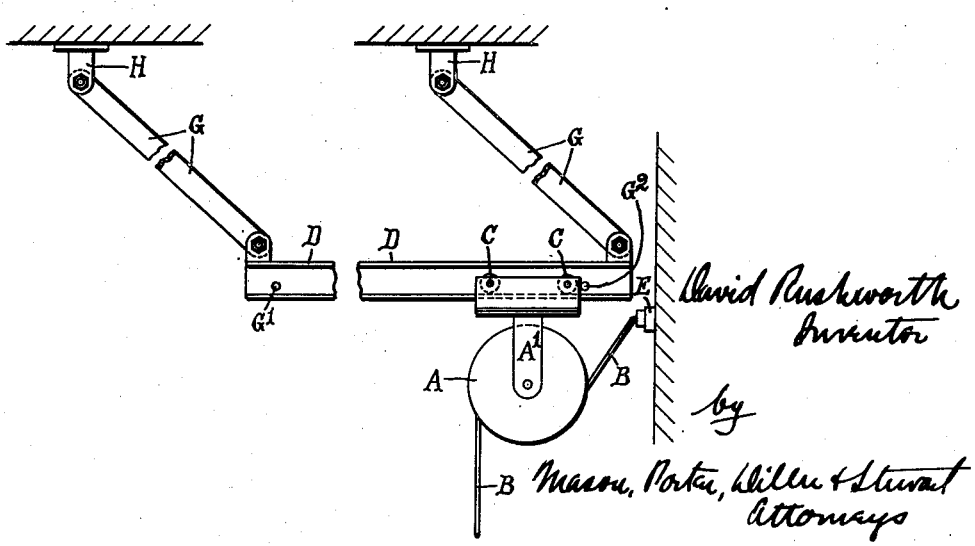

Aug. 8, 1950  D. RUSHWORTH  2,518,072
REEL FOR PORTABLE ELECTRICALLY OPERATED TOOLS
Filed Aug. 26, 1947  2 Sheets-Sheet 2

David Rushworth
Inventor by Mason, Porter, Miller & Stewart
Attorneys

Patented Aug. 8, 1950

2,518,072

UNITED STATES PATENT OFFICE 2,518,072

REEL FOR PORTABLE ELECTRICALLY OPERATED TOOLS

David Rushworth, West Bridgford, England

Application August 26, 1947, Serial No. 770,664
In Great Britain May 26, 1943

Section 1, Public Law 690, August 8, 1946
Patent expires May 26, 1963

11 Claims. (Cl. 242—107)

This invention relates to improvements in apparatus for use with portable electrically or fluid operated tools or apparatus or the like of the kind in which the electrical supply cable or other flexible fluid conductor is mounted on a drum and is attached thereto intermediate its ends so that the supply cable or other conductor is payed out or taken up on both sides of the drum according to the direction of rotation of the drum. The object of the present invention is to provide apparatus of the kind referred to for use with an overhead power supply from a power point to a portable electrically or other power operated tool which will reduce the sag in the cable or other power conductor and also reduce the drag on the tool caused by the cable or conductor.

According to this invention the apparatus for an overhead power supply comprises a rotatable drum, to which the electric supply cable or other form of flexible conductor is secured intermediate its ends, mounted in a cradle adapted to move relatively to the ground as the drum pays out or winds up the supply cable or flexible conductor and which is supported above the ground by means which are independent of the supply cable or flexible conductor. The cradle is attached to the end of an arm or the like or provided with wheels to run along an overhead beam. The drum is provided with spring actuated means to re-wind the cable or conductor thereon, when desired, the cable or conductor being drawn off the drum against the action of the spring.

The invention will now be more particularly described with reference to the accompanying drawings in which—

Fig. 1 is a side elevation and

Fig. 2 is an end elevation of apparatus constructed according to this invention adapted for use with an overhead beam and shown in its inoperative position.

Fig. 3 is a side elevation of the apparatus shown in Figs. 1 and 2 when cable has been drawn off the drum.

Fig. 4 is a side elevation showing an alternative arrangement wherein the overhead beam is also movable.

Like letters indicate like parts throughout the drawings.

Figs. 6 and 7 are drawn to a larger scale than the remaining figures.

Figure 5:
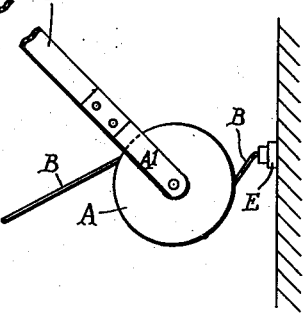
Fig. 5 is a side elevation showing the cradle supported by an arm.

In carrying out this invention the cable drum A is of a convenient size to accommodate the necessary length of flexible cable B to provide the desired amplitude of movement to the tool or the like and is rotatably mounted in any convenient manner in a suitable cradle. In one arrangement for use with an overhead supply to a portable tool the cradle $A^1$ (see Figs. 1 and 2) is provided with wheels C adapted to engage with an overhead beam D or other suitable support so as to permit of the movement of the cradle along the beam. One end of the flexible supply cable B is connected to a power point E adjacent to the end of the beam and its other end is connected to the portable tool (not shown) and is preferably supported at a point a convenient distance from the tool by securing it to a carriage F adapted to run along the beam D. At a point intermediate the ends of the cable B and preferably at a point which is mid-way between the end connected to the power point E and the point where it is supported by the carriage F the cable is secured to the drum A.

The drum A is provided with spring actuated means to rotate the drum to wind the cable thereon and take up any slack in the cable B. It will therefore be seen that with the arrangement described, when the drum A is wound up cable extending on both sides of the drum will be wound thereon and conversely payed out when the drum is turned in the opposite direction. As a result of this arrangement when the carriage F is moved away from the power point E cable will be drawn off the drum A and the cradle $A^1$ supporting the drum will move along the beam and maintain the drum in a position which is midway between the carriage and the power point as shown in Fig. 3. When the carriage is moved in the opposite direction, that is, towards the power point E the drum automatically takes up the cable and moves along the beam D to maintain a position midway between the carriage F and the power point E. As a result the cable E is always supported at a point midway between the power point and the carriage consequently reducing the sag in the cable and also reducing the drag on the carriage and without the necessity of providing electrical connections or contacts on the drum.

If desired suitable brake mechanism may be provided on the carriage and/or the cradle to retain them in any desired position.

In a modification of the arrangement just described the beam along which the cradle moves is also movable. As shown in Fig. 4, this beam D is carried by parallel arms G. These arms G have their lower ends pivoted to the ends of the beam D and their upper ends pivoted to brackets H secured to some overhead fixture so that the beam can swing in a vertical plane. The drum A is provided with spring actuated means for rotating the drum to wind the cable B thereon and Fig. 4 shows the apparatus in its inoperative position. When the cable is drawn off the drum A the beam first swings until the arms G are vertical. The cradle $A^1$ then travels along the beam until it engages the end stop $G^1$. If more cable is then pulled off the drum the beam will swing in the direction of the pull of the cable and give a further limited movement. An end stop $G^2$ is provided at the other end of the beam to prevent the cradle leaving the beam at that end.

When the amplitude of movement required for the tool is relatively small the arrangement shown in Fig. 5 may be adopted. In this case the cradle $A^1$ is attached to the free end of an arm J the other end of which is pivoted to a fixed bracket K secured in a convenient position, so that as the cable B is drawn off the drum the latter can swing forward in the direction of the pull. Spring actuated means are provided for rewinding the cable on the drum so that when the cable is released the drum returns to the position shown in Fig. 5. If preferred the cradle may be attached to the end of a wire cable instead of an arm.

Figure 6:
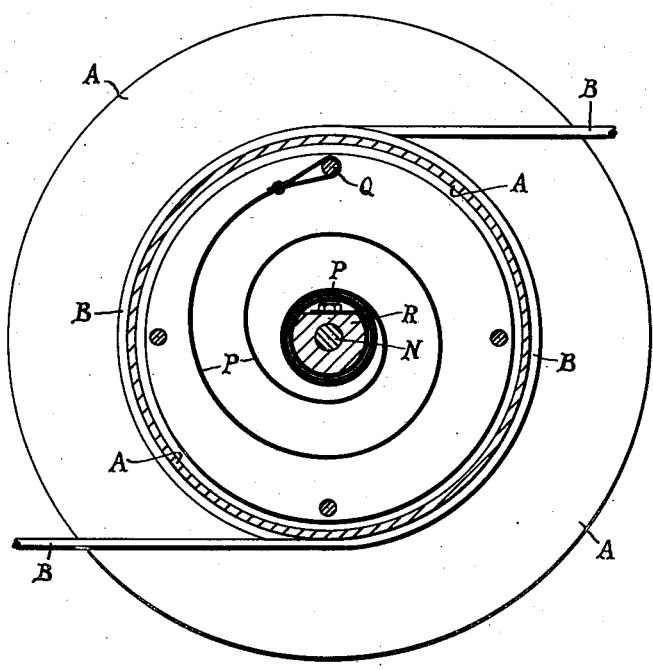
Fig. 6 is a cross section of the cable drum showing one method of providing a spring for re-winding the cable on the drum and Fig. 7 is a plan of the cable drum showing a method of securing the cable to the drum at a point intermediate its ends and the disposition of the cable thereon.

The spring actuated mechanism for re-winding the cable on the drum may be of any suitable construction and a simple method of effecting this operation is shown in Fig. 6. For this purpose the cable drum A is loosely mounted on a fixed axle N secured in any convenient manner to the cradle. Disposed in the hollow central part of the drum A is a spring P, the outer end of which is secured to a rod Q secured to the drum A whilst the inner end of the spring P is either secured to the axle N, or as shown in Fig. 6 to a boss R secured on the axle N. The strength and length of the spring required will depend on the size of the cable and the length of the cable which it is desired to accommodate on the drum. With this arrangement it will be seen that the spring will be wound up as cable is drawn off the drum and that when the cable is released the spring will rotate the drum in the reverse direction to wind the cable thereon, the drum moving towards or away from the power supply point according to the direction of rotation of the drum.

Figure 7:
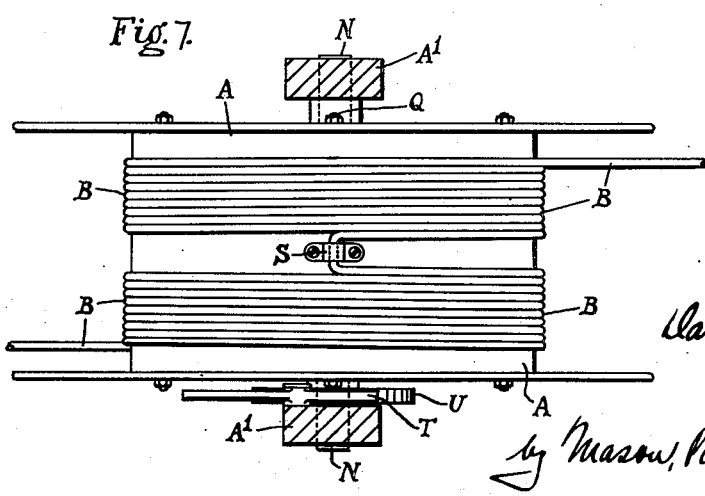

As previously described the cable is secured to the drum at a point intermediate its ends. The cable may be secured to the drum in any convenient manner and this may conveniently be effected as shown in Fig. 7 wherein the cable B is secured to the drum A, intermediate its ends, by a clip S attached to the drum by screws. It will however be clearly understood that there is no break in the continuity of the cable at the point where it is secured to the drum.

When brake or locking mechanism is provided to neutralise the action of the return spring until such time as it is desired to rewind the cable on the drum, this brake mechanism may be adapted to lock the wheels of the cradle and be put into and out of operation as desired, or comprise a pawl T to engage a ratchet wheel U secured to the drum A to prevent re-winding of the drum until the pawl is tripped.

In the foregoing description the invention has been described in connection with apparatus for use with electrically operated tools. It will however be readily understood that the drum which constitutes a part of the apparatus is equally well adapted to accommodate a flexible tube and the apparatus so modified used to convey air, gas or fluid under pressure from a supply point to a portable tool or other apparatus.

What I claim as my invention is:

1. Apparatus for an overhead power supply for use with electrically or fluid operated tools comprising a flexible power supply conductor having one end connected to a fixed power supply source and the other end connected to a portable tool or the like, an overhead support extending horizontally from said source, a rotatable drum, on which the conductor is wound and is secured intermediate its ends, a spring to turn the drum to wind thereon the conductor withdrawn therefrom, a cradle to carry the drum and adapted to move along said overhead support towards or away from the power supply source as the conductor is wound on or withdrawn from the drum and a carriage to which the opposite end of the conductor is secured and adapted to move along the overhead support towards or away from the drum when the conductor is wound or withdrawn therefrom.

2. Apparatus according to claim 1 in which the cradle is provided with wheels to run along an overhead support.

3. Apparatus according to claim 1 in which the cradle is provided with wheels to run along a beam.

4. Apparatus according to claim 1 in which the cradle is provided with wheels to run along a beam and the electric supply cable or other flexible conductor is supported a convenient distance from the tool or the like by a carriage adapted to run along the beam.

5. Apparatus according to claim 1 in which the cradle is provided with wheels adapted to run along a beam which is mounted so that it can swing in a vertical plane.

6. Apparatus according to claim 1 in which the cradle is suspended from a fixed point so as to be movable about the said point.

7. Apparatus according to claim 1 in which the cradle is secured to one end of an arm, the other end of which is pivoted to a fixed bracket.

8. Apparatus according to claim 1 in which the drum is mounted on a fixed axle carried by the cradle and is formed with a hollow central part having located therein a spring the ends of which are connected to the drum and axle respectively.

9. Apparatus according to claim 1 in which the drum is provided with locking mechanism to hold the drum against the action of the spring until such time as the locking mechanism is released.

10. Apparatus according to claim 1 in which ratchet and pawl mechanism is provided in association with the drum to hold the latter against the action of the spring until such time as the pawl is moved into an inoperative position.

11. Apparatus for an overhead power supply for use with portable electrically or fluid operated tools comprising a flexible conductor connected between a power supply point and a portable tool or the like, a drum on which the conductor is wound and secured thereto intermediate its ends, an overhead beam, a cradle to carry the drum, wheels on the cradle to run along the overhead beam, a spring associated with the drum to turn the drum to wind thereon conductor withdrawn from the drum, a carriage to which the conductor is secured a suitable distance from the tool or the like, wheels on the carriage to run along the overhead beam and means associated with the drum to lock the latter against the rewinding action of the spring when desired.

DAVID RUSHWORTH.

REFERENCES CITED

The following references are of record in the file of this patent:

UNITED STATES PATENTS

| Number | Name | Date |
|---|---|---|
| Re. 18,460 | Pieper | May 10, 1932 |
| 915,288 | Hagstrom et al. | Mar. 16, 1909 |
| 1,225,658 | Lawrence | May 8, 1917 |